United States Patent [19]

Tanaka et al.

[11] 4,367,316

[45] Jan. 4, 1983

[54] VULCANIZED ELASTOMERIC MOLDED ARTICLE

[75] Inventors: Chiaki Tanaka, Chita; Masanobu Morikawa, Nagoya; Yoshio Kohno, Okazaki, all of Japan

[73] Assignee: Toray Industries, Inc., Tokyo, Japan

[21] Appl. No.: 900,806

[22] Filed: Apr. 27, 1978

Related U.S. Application Data

[63] Continuation-in-part of Ser. No. 745,928, Nov. 29, 1976, abandoned.

[30] Foreign Application Priority Data

Nov. 27, 1975 [JP] Japan .............................. 50/141175
Nov. 27, 1975 [JP] Japan .............................. 50/141176

[51] Int. Cl.$^3$ .......................... C08L 9/02; C08L 7/00; C08L 9/06; C08L 67/02
[52] U.S. Cl. .................................... 525/173; 525/177
[58] Field of Search ................... 260/3, 873; 525/173, 525/177

[56] References Cited

U.S. PATENT DOCUMENTS

| | | | |
|---|---|---|---|
| 3,963,802 | 6/1976 | Shih | 260/873 |
| 3,965,055 | 6/1976 | Schichman et al. | 260/873 |
| 4,124,653 | 11/1978 | Whitlock | 260/873 |

FOREIGN PATENT DOCUMENTS 52-65542   5/1977  Japan .
52-138546 11/1977  Japan .

*Primary Examiner*—Wilbert J. Briggs, Sr.
*Attorney, Agent, or Firm*—Austin R. Miller

[57] ABSTRACT

A vulcanized molded article comprising a blend of about 5–90% by weight of a thermoplastic copolyester or block copolyester elastomer and about 95–10% by weight of a vulcanizable synthetic or natural rubber having an improved adhesive property with polyester fibers or fabrics.

9 Claims, No Drawings

VULCANIZED ELASTOMERIC MOLDED ARTICLE

The present application is a continuation-in-part of application Ser. No. 745,928, filed Nov. 29, 1976 now abandoned.

BACKGROUND OF THE INVENTION

The present invention relates to a vulcanized molded article which comprises an elastomeric polyblend of a thermoplastic copolyester and a vulcanizable synthetic or natural rubber.

Vulcanized natural or synthetic rubbers are widely used for a variety of purposes, such as tubings, hoses, tires, belts, coated fabrics and sealants in the automobile industry. However, such rubbers have various defects and have a restricted usage. For example, SBR (styrene-butadiene rubber) and NR (natural rubber) exhibit poor tensile and tear strength, and poor oil resistance. NBR (nitrile butyl rubber) is comparably superior in oil resistance, but it is sensitive to oxygen or ozone at an elevated temperature. CR (chloroprene rubber) has comparatively good resistance to deterioration caused by heat or oxygen, but they lose their elastomeric properties in certain oils such as ASTM #3 oil or Fuel D. Therefore, there has been needed a rubber having a good elastic property at both low and high temperatures, a good oil resistance, a good abrasion resistance and a good oxygen or ozone resistance.

U.S. Pat. No. 3,965,055 to Shichman et al. discloses a modified elastomer composition of a semi-crystalline, thermoplastic resin and a rubber. However, the resins do not include a polyester of the polybutylene terephthalate series which have been found to be to more advantages.

U.S. Pat. No. 3,963,802 to Shih relates to thermoplastic copolyether esters which are softened with the retention of toughness by blending therewith certain ethylene copolymers.

Furthermore, polyester fibers or fabrics have recently become popular as reinforcing materials because of their excellent rigidity and high modulus and it is strongly desirable to improve the adhesiveness of rubbers to polyesters.

Thus, the principal object of this invention is to provide a vulcanized elastomeric compound having good resilience at low and high temperatures, heat and oxygen/ozone resistance, excellent oil and fuel resistance, impact strength, good abrasion property and increased scuff resistance. In addition, the blends which are rich in copolyester exhibit superior ozone resistance, oil and fuel resistance, improved stiffness, impact resistance and electric insulating properties and their mechanical strength are maintained even at elevated temperatures.

Another object of this invention is to provide a rubber composition having a good adhesive strength to polyester fibers or fabrics.

We have found the foregoing objects are achieved by blending a thermoplastic copolyester with a synthetic or natural rubber and vulcanizing the polyblend. It is a surprising discovery that copolyester or copolyester elastomers are so compatible with rubber that an intimate blend is achieved.

DETAILED DESCRIPTION OF THE INVENTION

The thermoplastic copolyesters useful for the polyblend of this invention include, in general, linear saturated condensation products or diols and dicarboxylic acids, or reactive derivatives thereof and block copolyether esters. Examples of the dicarboxylic acids are terephthalic acid, isophthalic acid, orthophthalic acid, azelaic acid, sebacic acid, adipic acid, dodecanedicarboxylic acid, naphthalene dicarboxylic acid, cyclohexane dicarboxylic acid, etc. Diols used in this invention are ethylene glycol, 1,4-butanediol, 1,2- or 1,3-propanediol, 1,6-hexanediol, xylylene diglycol, cyclohexane dimethanol and 1,4-cyclohexanediol. Preferably, the copolyesters may be the condensation polymers prepared from a dicarboxylic acid component comprising 50–95 mol % of terephthalic acid and a glycol component comprising at least 50 mol % of 1,4-butanediol. More preferably, the glycol component consists essentially of 1,4-butanediol. The block copolyether esters which are useful for the polyblend of this invention are generally produced by reacting at least one long chain glycol with at least one low molecular weight diol, as mentioned above, and at least one dicarboxylic acid, as mentioned above.

The long chain diols include poly(alkylene oxide) glycols wherein the alkylene group has 2–10 carbon atoms, such as poly(ethylene oxide) glycol, poly(propylene oxide) glycol, poly(ethylene-propylene oxide) glycol, poly(tetramethylene oxide) glycol, poly(hexamethylene oxide) glycol, and poly(decamethylene oxide) glycol. Polybutadiene diol is also used as a long chain diol component. The long chain polyether glycol has a molecular weight of 400–6000, preferably 500–4500. The ratio of the short ester segment to the long ether segment is from 15/85 to 90/10. Preferably, they comprise polybutylene terephthalate-poly(tetramethylene oxide) glycol or polybutylene tere-/isophthalate-poly(tetramethylene oxide) glycol or polybutylene tere-/orthophthalate-poly(tetramethylene oxide) glycol.

The copolyester or block copolyester elastomer may preferably have a relative viscosity of more than 1.2 measured by the standard method using 1.5 g. of polymer per 100 mls. of orthochlorophenol at 25° C. The copolyester or block copolyester elastomer may have a melting point of from 80°–220° C., preferably from 100°–200° C.

Vulcanizable rubbers used in the present invention include SBR, NBR, CR and natural rubbers. Preferably, nitrile rubber or chloroprene rubber are used. A nitrile rubber modified by copolymerizing $\alpha,\beta$-unsaturated carboxylic acid monomer may also preferably be used.

The polyblend of the present invention may comprise about 5 to 90% by weight of a thermoplastic copolyester and about 95 to 10% by weight of a vulcanizable synthetic or natural rubber. The preferred polyblend may comprise about 5 to 50% by weight of a thermoplastic copolyester and about 95 to 50% by weight of a vulcanizable synthetic or natural rubber. By using a major amount of the rubber component, a fine dispersion of the copolyester component can be attained and a more excellent elastic article can be obtained.

The polyblend of copolyester and unvulcanized rubber may be prepared by merely mixing those components at a sufficiently elevated temperature to soften or melt them until a uniform blend is formed. It is important in order to obtain the best results, that the size of the finely divided particles in the blend not exceed 50μ, and preferably 10μ, which is easily achieved by the simple mixing of the components in this invention. Suitable mixing devices include heated rubber mills, "Banbury mixers" and/or extruders, and preferably twin barrel extruders or single extruders, filled with a mixing attachment on the screw. The blending is also carried out by mixing the polyester emulsion with an unvulcanized rubber emulsion followed by coagulation of the mixed emulsion and then kneading the resultant solid portion at an elevated temperature. A vulcanizing agent may be added to the polyblend at any stage before vulcanization.

The polyblend can be injection-, compression-, transfer-, and blow-molded to form elastic molded articles after adding a vulcanizing agent. They can also be readily extruded to produce tubing, film and cross-head extruded for hoses, wires, cables and laminates. Also, they can be easily calendered to produce films and sheeting, to produce calender coat woven and non-woven fabrics, such as polyester fabrics or polyester tire cords.

The molded or shaped articles may be vulcanized under any conventional method and under any conventional condition for the rubber component contained in the polyblend. As a vulcanizing agent, zinc oxide, an oxide of a Group II metal of the Period Table, sulfur, and an organic perioxide or their mixtures, in combination with accelerators or retarders such as mercaproimidazoline, diorthotolyl guanidine, benzothiazyl disulfide, (zinc salt of) 2-mercaptobenzothiazole, tetramethylthiuram disulfide, tetramethylthiuram monosulfide, zinc diethyldithiocarbonate, ethylene thiourea and cyclohexyl benzothiazyl sulfonamide may be used in the present invention.

Although the blends of this invention possess many desirable properties, the compositions may also be stabilized against heat or oxygen/ozone or UV-radiation. This can be performed by the incorporation of stabilizers into the blends.

Satisfactory stabilizers comprise phenols and their derivatives, amines and their derivatives, compounds containing both hydroxyl and amine groups, hydroxyazines, oximes, diarylosazones, diacetyl diarylosazones, N-substituted ureas, bisphenol sulfides, diamino durenes, p-alkoxy-N-akylanilines, benzophenones and benzotriazoles. Representative compounds useful as stabilizers include aldol-α-naphthyl amine, 1,2-dihydro-2,2,4-trimethylquinoline, N-isopropyl-N'-phenyl-p-phenylene diamine, phenyl-β-naphthyl amine, N,N'-diphenyl-p-phenylene diamine, N,N'-di-β-naphthyl-p-phenylene diamine, 2,2'-methylene-bis(4-methyl-6-t-butyl phenol), 2-mercaptobenzoimidazole, 6-ethoxy-1,2-dihydro-2,2,4-trimethylquinoline, N-isopropylxanthate, and 1,3-dibutylthiourea.

The properties of the composition can be modified by incorporation of various conventional inorganic fillers, such as carbon black, zinc oxide, titanium oxide, silica gel, aluminum oxide, whisker, wallastenite clay and glass fiber. The composition may also contain various additives such as plasticizers, pigments, flame retardants, nucleating agents, and blowing agents.

The vulcanized elastomeric molded articles of the present invention may be economically and practically applied to a variety of purposes, such as a tubing, hose, tire, belt, wire coating, shock absorber, acoustical sealant, electric insulator, coated fabric, sealant, O-ring, shoe soling, heel lift, packaging materials, flooring materials, roofing materials, automotive applications, factory applications and gears.

The following examples further illustrate the invention.

EXAMPLE 1

Copolyester (A)

In a glass flask having a stainless steel stirrer with a helical ribbon type screw, 94.5 parts of dimethyl terephthalate, 41.5 parts of dimethyl isophthalate, 94.5 parts of 1,4-butanediol and 62.0 parts of poly(tetramethylene oxide) glycol having a molecular weight of about 1000 were placed in the presence of 0.10 parts of tetrabutyl titanate. The mixture was heated with stirring at 210° C. for 2 hours to distill off methanol from the reaction system. The recovered methanol was 42.6 parts, corresponding to 95% of the theoretical weight. After adding 0.42 parts of "Irganox" 1098 to the reaction mixture, the reaction temperature was then raised to 245° C. and the pressure on the system was reduced to 0.2 mm Hg for a period of 50 minutes. Polymerization was continued for two hours under these conditions. The intrinsic viscosity of the product in orthochlorophenol at 25° C. was 1.05 and the polymer showed a melting point of 160° C.

Copolyester (B)

Using 199 parts of dimethyl terephthalate, 216 parts of 1,4-butanediol and 200 parts of poly(tetramethylene oxide) glycol under the same reaction conditions as in copolyester (A), copolyester (B) was prepared. The copolyester (B) exhibited a melting point of 201° C. and an intrinsic viscosity of 1.50.

Elastomer Compositions

Blends of copolyester (A) or (B) with some type of unvulcanized rubber were prepared in the blend ratios as given in Table 1 using an extruder (having 30 mm φ screw) and heated at 200° C. After mixing, the desirable vulcanizing agents, vulcanizing auxiliary agents and vulcanization accelerators were added to the blended rubber on a roller mill at from 70°–80° C., the vulcanization was performed at a temperature of from 140°–150° C. for 30 minutes using a press mold. Typical properties of these blends are also listed in Table 1 in comparison with unblended rubbers.

EXAMPLE 2

With 60 parts of copolyester (A) were mixed 40 parts of SBR, 5 parts of zinc oxide, 2 parts of stearic acid and 20 parts of carbon black on a Banbury mixer at 180° C. for 10 minutes. Then, 2 parts of sulfur and 2.5 parts of benzothiazyldisulfide were added to the mixture on a rubber roll heated at 70° C. A portion was then molded and vulcanized at 150° C. under a pressure of 50 kg/cm² for 30 minutes.

TABLE 1

| | Example | | | | | | | Control | | |
|---|---|---|---|---|---|---|---|---|---|---|
| Number | 1-1 | 1-2 | 1-3 | 1-4 | 1-5 | 1-6 | 1-7 | 1-8 | 1-9 | 1-10 |
| Copolyester | A | A | A | A | A | B | B | — | — | — |

TABLE 1-continued

| Number | Example | | | | | | | Control | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Rubber | SBR[1] | SBR | SBR | NBR[2] | CR[3] | NBR | SBR | SBR | NBR | CR |
| Blend ratio (copolyester/rubber) | (75/25) | (50/50) | (25/75) | (25/75) | (25/75) | (50/50) | (50/50) | (0/100) | (0/100) | (0/100) |
| Thermal Resistance[4] (%) | 98 | 90 | 77 | 90 | 82 | 95 | 93 | 36 | 56 | 53 |
| UV Resistance[5] (%) | 98 | 82 | 61 | 55 | 70 | 62 | 86 | 25 | 20 | 65 |
| Oil Resistance[6] (%) | 6 | 14 | 16 | 10 | 16 | 6.8 | 9.9 | 44 | 14 | 21 |
| Compression Set[7] (%) | 10 | 12 | 13 | 12 | 6.8 | 8.4 | 10 | 15 | 11 | 6.3 |
| Durometer Hardness[8] A | 62 | 61 | 58 | 56 | 59 | 61 | 60 | 58 | 50 | 55 |

[1]SBR: Nippon Zeon "Nipol" 1502
[2]NBR: Nippon Zeon "Nipol" 1043
[3]CR: duPont "Neoprene" GNA
[4]Thermal Resistance: Retention of elongation at break after aging at 100° C. for 10 hours in gear oven.
[5]UV Resistance: Retention of elongation at break after UV irradiation at 50° C. for 50 hour in Phade-O-Meter.
[6]Oil Resistance: Weight increasing rate after immersion to ASTM No. 3 Oil at 100° C. for 50 hours.
[7]Compression Set: ASTM B-Method, 100° C., 70 hours.
[8]Durometer Hardness: ASTM D-2240

This vulcanized blend showed good elastic properties as listed in Table 2.

TABLE 2

| Physical Properties | | Test Methods |
|---|---|---|
| Tensile Strength (kg/cm$^2$) | 450 | ASTM D-412 |
| Elongation at Break (%) | 430 | ASTM D-412 |
| Tensile Set (100% Strain) (%) | 27 | ASTM D-412 |
| 100% Modulus (kg/cm$^2$) | 80 | ASTM D-797 |
| 300% Modulus (kg/cm$^2$) | 140 | ASTM D-797 |
| Durometer Hardness | 88A | ASTM D-2240 |

EXAMPLE 3

By mixing 60 parts of SBR (Nippon Zeon "Nipol" 1502) with 40 parts of block copolyether ester (B) by a twin-screw extruder having 45 mm φ screws at 200° C., a finely mixed blend was prepared. To 100 parts of the blend, 4 parts of zinc oxide, 1 part of stearic acid, 10 parts of MPC black, 1.5 parts of sulfur and 1.5 parts of DM were added on a rubber mill at a temperature of 80° C., and then the compound was molded and vulcanized at 150° C. for 30 minutes. The properties of the resulting rubber blend are shown in Table 3 in comparison with four control rubber compositions.

Control 1

SBR having no copolyester components.

Control 2

The blend without the process of extrusion: Block copolyether ester (B) was blended with SBR and the same vulcanizing agents on a rubber mill. In this case, copolyether ester (B) did not finely disperse into the SBR matrix but formed a macro domain of above 50μ. Consequently, the blend showed poor mechanical properties.

Control 3

A blend of a block copolyether ester with the previously vulcanized SBR.

When 40 parts of a block copolyether ester (B) was blended with 60 parts of previously vulcanized SBR using an extruder heated at 200° C., the compatibility between the two components was too poor to form a finely divided structure. The mixture was press molded to prepare test pieces.

Control 4

Polybutylene terephthalate having an intrinsic viscosity of 1.2 was used in place of block copolyether ester (B) in Example 3. Blending was performed in a similar manner except at a temperature of 240° C., and the resulting rubber blend showed a macro phase separation and poor elastic properties.

TABLE 3

| | Example 3 | Control | | | |
|---|---|---|---|---|---|
| | | 1 | 2 | 3 | 4 |
| | Composition | | | | |
| | (B)/SBR (40/60) | SBR (0/100) | (B)/SBR (40/60) | (B)/SBR (40/60) | Polybutylene terephthalate/ SBR (40/60) |
| Divided state (divided particle size) | << 50μ (1-10μ) | — | >> 50μ | >> 50μ | > 50μ |
| Tensile Strength (kg/cm$^2$) | 200 | 110 | 120 | 140 | 400 |
| Elongation at Break (%) | 460 | 600 | 50-300 | 25-400 | 30 |
| Shore Hardness A | 62 | 60 | 60-70 | 59-75 | 95 |
| Compression Set (%) (100% strain) | 15 | 16 | 40 | 45 | 53 |
| Thermal Resistance at 100° C. | 0 | X | 0 | 0 | 0 |

EXAMPLE 4

Substantially following the procedures described in Example 1, a block copolyether ester (C) was prepared from the following materials: 162 parts terephthalic acid, 87 parts isophthalic acid, 240 parts 1,4-butanediol and 130 parts poly(tetramethylene oxides) glycol, number average molecular weight 1000.

70 parts of "Hycar" 1072, nitrile rubber having pendant carboxylic groups prepared from 27% of acrylonitrile, 71% of butadiene, 2% of acrylic acid, and 30 parts of copolyether ester (C) were blended in a 30 mm φ extruder heated at 200° C. to an almost transparent blend. To 100 parts of the blend were added 5 parts of zinc oxide, 1 part of stearic acid, 0.5 parts of sulfur, 1 part of cyclohexylbenzothiazyl sulfonamide (CZ) and 2 parts of tetramethylthiuram disulfide (TT) and kneaded on a rubber roller mill. A portion of the compound was then molded and vulcanized at 155° C. under a pressure of 50 kg/cm² for 30 minutes. For comparison, nitrile rubber having no copolyether ester was prepared. The comparison results are given in the following Table 4.

TABLE 4

|  | Example 4 | Control |
|---|---|---|
|  | Composition | |
|  | Copolyester (C)/ nitrile rubber (30/70) | Nitrile Rubber |
| Tensile Strength (kg/cm²) | 150 | 38 |
| Elongation at Break (%) | 380 | 330 |
| Tensile Set (%) (100% Strain) | 4.0 | 4.5 |
| 100% Modulus (kg/cm²) | 120 | 84 |
| After aging at 100° C. for 50 hours | | |
| Tensile Strength (kg/cm²) | 150 | 21 |
| Elongation at Break (%) | 340 | 190 |
| 100% Modulus (kg/cm²) | 125 | 130 |
| Weight Increase after Oil Absorption (%) | | |
| ASTM No. 3 Oil 70° C. × 50 hours | 17 | 24 |

EXAMPLE 5

In a similar manner as in Example 1, copolyester (D) was prepared from the following materials: 126.1 parts dimethyl terephthalate, 67.9 parts dimethyl isophthalate and 270 parts 1,4-butanediol. The copolyester (D) had a melting point of 168° C. and an intrinsic viscosity of 1.23. Seventy-five parts of SBR ("Nipol" 1052) and 25 parts of copolyester (D) were subjected to a melt-compounding procedure by a 30 mm φ extruder heated at 200° C. A blend in which copolyester (D) particles were dispersed finely at about from 1–5 microns was prepared. To 100 parts of the blend were mixed 5 parts of zinc oxide and 2 parts of stearic acid on a Banbury Mixer for 30 minutes, and then 2 parts of sulfur and 2.5 parts of benzothiazyl disulfide were added. The mixture was kneaded on a rubber roll mill and heated at 70° L C. The resulting blended composition was molded and vulcanized at 150° C. under a pressure of 50 kg/cm² for 30 minutes. Test specimens were subjected to the tests as given in Table 5 with the test values listed.

TABLE 5

|  | Example 5 | Control Copolyester (D) | SBR |
|---|---|---|---|
| Tensile Strength (kg/cm²) | 170 | 590 | 150 |
| Elongation at Break (%) | 700 | 320 | 750 |
| Tensile Set (%) (100% Strain) | 19 | 90 | 15 |
| 300% Modulus (kg/cm²) | 52 | 3,000 | 40 |
| Shore Hardness | 70A | 60D | 56A |
| After Aging at 100° C. for 7 hrs. | | | |
| Tensile Strength (kg/cm²) | 150 | 610 | 85 |
| Elongation at Break (%) | 570 | 270 | 310 |
| Shore Hardness | 73A | 60D | 74A |

EXAMPLE 6

In the manner described in Example 1, copolyester (E) was prepared from the following materials: 113.5 parts dimethyl terephthalate, 61.1 parts dimethyl phthalate, and 121.5 parts 1,4-butanediol. Copolyester (E) exhibited a melting point of 170° C. and an intrinsic viscosity of 1.30. Seventy parts of nitrile rubber ("Hycar" 1042) and 30 parts of copolyester (E) were blended by a 30 mm φ extruder heated at a temperature of 210° C. To 100 parts of the blend were added and mixed 5 parts of zinc oxide, 1 part of stearic acid, 25 parts of MPC black, 2 parts of sulfur and 1.5 parts of tetrathiuram disulfide on a rubber roll mill at 70° C., and a portion was molat 150° C. for 30 minutes. For comparison, a composition to which the copolyester component was added and kneaded along with the above-mentioned additives on a rubber roll mill and heated at 70° C. was prepared and tested. The results are given in the following Table 6.

TABLE 6

|  | Example 6 | Control | |
|---|---|---|---|
|  | Composition | | |
|  | Copolyester (E)/ NBR (30/70) | Copolyester (E)/ NBR (30/70) | NBR (100) |
| Mixer for copolyester blend | Extruder heated at 210° C. | Roll heated at 70° C. | — |
| Particle size of copolyester in NBR matrix | 50μ (1–10μ) | 50μ | — |
| Tensile Strength (kg/cm²) | 420 | 210 | 250 |
| Elongation at Break (%) | 400 | 100–400 | 300 |
| JIS hardness | 71A | 40–96A | 67A |
| Oil Resistance | excellent | good | good |
| Abrasion Resistance | excellent | good | good |
| Ozone Resistance | good | poor | poor |
| Adhesion to polyethylene terephthalate fabrics | excellent | poor | poor |

EXAMPLE 7

(A) Into a glass flask having a stainless steel stirrer with a helical ribbon type screw, 126.1 parts of dimethyl terephthalate, 67.9 parts of dimethyl isophthalate and 270 parts of 1,4-butanediol were placed in the presence of 0.10 parts of tetrabutyl titanate. The mixture was heated with stirring at 210° C. for two hours while distilling off the methanol from the reaction system. The recovered methanol was 60.8 parts, corresponding to 95% of the theoretical weight. After adding 0.40 parts of "Irganox" 1098 to the reaction mixture, the reaction temperature was raised to 245° C. and the pressure on the system was reduced to 0.2 mm Hg for a period of 50 minutes. Polymerization was continued for 2 hours under these conditions. The intrinsic viscosity of the product in orthochlorophenol at 25° C. was 1.23 and the polymer (F) showed a melting point of 168° C.

In a similar manner as above, a control copolyester (G) was prepared from the following materials: 116.4 parts dimethyl terephthalate, 77.6 parts dimethyl isophthalate and 124 parts ethylene glycol. The control copolyester (G) had a melting point of 160° C. and an intrinsic viscosity of 1.15.

(B) Seventy parts of NBR ("Hycar" 1042) and 30 parts of copolyester (F) were subjected to a melt-compounding procedure by a 30 mm φ extruder heated at 200° C. A blend in which copolyester (F) particles were finely dispersed at about 0.5–5 microns was prepared. To 100 parts of the blend were mixed 5 parts of zinc oxide, 1 part of stearic acid, 2 parts of sulfur and 2.5 parts of tetrathiuram disulfide. The resulting blend was then kneaded on a rubber roll mill heated at 70° C., molded and vulcanized at 150° C. under a pressure of 50 kg/cm² for 30 minutes. Test specimens were subjected to the tests in Table 7 with the test values as noted.

As a comparison, a control copolyester (G) was used in place of the copolyester (F). In spite of the fact that the blend was performed in a similar manner, the resulting blended rubber showed a macro-phase separation in which the particle size was 5–50 microns and showed poor elastic properties and chemical resistance.

TABLE 7

|  | Copolyester (F) Blend | Control Polyester (F) Blend |
|---|---|---|
| Tensile Strength (kg/cm²) | 210 | 110 |
| Elongation at Break (%) | 350 | 205 |
| Tensile Set at 70° C. (100% Strain) (%) | 21 | 35 |
| 300% Modulus (kg/cm²) | 200 | — |
| Shore Hardness | 73A | 70A |
| After Aging at 100° C. for 96 hours |  |  |
| Tensile Strength (kg/cm²) | 170 | 93 |
| Elongation at Break (%) | 210 | 82 |
| Shore Hardness | 75A | 78A |
| After UV irradiation in Fade-O-Meter at 50° C. for 40 hours |  |  |
| Tensile Strength (kg/cm²) | 120 | 75 |
| Elongation at Break (%) | 180 | 70 |
| Shore Hardness | 75A | 81A |
| Oil Resistance Weight Increase in Fuel D at 40° C. for 70 hours (%) | 42.5 | 74 |

EXAMPLE 8

Seventy parts of SBR ("Nipol" 1502) and 30 parts of copolyester (F) were blended by a 30 mm φ extruder heated at 200° C. To 100 parts of the blend were added and mixed 5 parts of zinc oxide, 1.5 parts of stearic acid, 5.0 parts of paraflux, 25 parts of MPC black, 1.75 parts of sulfur and 1.5 parts of 2-mercaptobenzothiazole on a rubber roll mill at 70° C. and the resultant portion was molded and vulcanized at 150° C. for 30 minutes.

As a comparison, a control copolyester (G) was used in place of the copolyester (F) and the resulting blended composition followed by a vulcanization process was tested. The results obtained are as given in the following Table 8.

TABLE 8

|  | Copolyester (F) Blend | Control Polyester (G) Blend |
|---|---|---|
| Tensile Strength (kg/cm²) | 180 | 140 |
| Elongation at Break (%) | 650 | 360 |
| Tensile Set at 70° C. (50% Strain) (%) | 23 | 33 |
| Shore Hardness | 69A | 67A |
| After Aging at 100° C. for 96 hours. |  |  |
| Tensile Strength (kg/cm²) | 140 | 95 |
| Elongation at Break (%) | 350 | 190 |
| Shore Hardness | 70A | 75A |
| After UV Irradiation in Fade-O-Meter at 50° C. for 40 hours. |  |  |
| Tensile Strength (kg/cm²) | 150 | 110 |
| Elongation at Break (%) | 450 | 220 |
| Shore Hardness | 72A | 74A |
| Oil Resistance Weight Increase in Fuel D at 40° C. for 70 hrs. (%) | 82 | 270 |
| Copolyester Particle Divided Particle size (microns) | 0.3–5.0 | 5–50 |

We claim:
1. A vulcanizable polyblend which comprises an intimate mixture of 5 to 90% by weight of a block copolyether ester, in which the molecular weight of polyether chain is 400 to 6000 and the ratio of the short ester segment to the ether ester segment is from 15/85 to 90/10, and 95 to 10% by weight of vulcanizable rubber selected from the group consisting of chloroprene rubber, nitrile rubber, styrene-butadiene rubber and natural rubber.

2. The vulcanizable polyblend of claim 1 wherein the amount of thermoplastic copolyether ester is 5 to 50% by weight and that of the vulcanizable rubber is 95 to 50% by weight.

3. The vulcanizable polyblend of claim 1 including a vulcanizing agent.

4. The vulcanizable polyblend of claim 1 wherein the particles in said polyblend are not greater than 50μ.

5. A vulcanized molded article which comprises an intimate blend of 5 to 90% by weight of a block copolyether ester, in which the molecular weight of polyether chain is 400 to 6000 and the ratio of the short ester segment to the ether ester segment is from 15/85 to 90/10, and 95% to 10% by weight of a vulcanizable rubber selected from the group consisting of chloroprene rubber, nitrile rubber, styrene-butadiene rubber and natural rubber.

6. An elastomeric blend of (A) a butadiene/acrylonitrile copolymer and (B) a copolyetherester consisting essentially of 15–95% by weight of short chain ester units derived from a dicarboxylic acid and having a molecular weight not greater than 300 and a diol having a molecular weight not greater than 250, and 5–85% by weight of long chain ester units derived from a dicarboxylic acid having a molecular weight not greater than 300 and a poly(alkylene oxide) glycol having a number average molecular weight of 400–6000, said copolyetherester having a melting point of at least 100° C.; the blend containing from 1–50% by weight of component (A).

7. An elastomeric blend of (A) a butadiene/acrylonitrile copolymer and (B) a copolyetherester consisting essentially of 15–95% by weight of short chain ester units derived from a dicarboxylic acid and a diol having a molecular weight not greater than 250, and 5–85% by weight of long chain ester units derived from a dicarboxylic acid and a poly(alkylene oxide) glycol having a number average molecular weight of 400–6000, said copolyetherester having a melting point of at least 100° C., the blend containing about 5–50% by weight of component (B) and about 95–50% by weight of component (A).

8. An elastomeric blend of (A) a butadiene/acrylonitrile copolymer and (B) a copolyetherester consisting essentially of 15–95% by weight of short chain ester units derived from a dicarboxylic acid and a diol having a molecular weight not greater than 250, and 5–85% by weight of long chain ester units derived from a dicarboxylic acid and a poly(alkylene oxide) glycol having a number average molecular weight of 400–6000, said copolyetherester having a melting point of at least 100° C.; the blend containing from 10–95% by weight of component (A).

9. The blend of claim 8 wherein the dicarboxylic acid has a molecular weight from 146.14 to 247.36.

* * * * *

UNITED STATES PATENT AND TRADEMARK OFFICE
CERTIFICATE OF CORRECTION

PATENT NO. : 4,367,316

DATED : January 4, 1983

INVENTOR(S) : Chiaki Tanaka et al

It is certified that error appears in the above-identified patent and that said Letters Patent is hereby corrected as shown below:

Column 7, line 44, after "70°" delete "L"

Column 8, line 9, after "was" delete "molat" and insert --molded and vulcanized at--

Signed and Sealed this

First Day of November 1983

[SEAL]

Attest:

GERALD J. MOSSINGHOFF

Attesting Officer

Commissioner of Patents and Trademarks